Feb. 22, 1944.     J. R. HAGEMANN     2,342,579
PRESSURE REGULATING SYSTEM
Original Filed Sept. 19, 1938    2 Sheets-Sheet 1

Inventor
J. R. Hagemann
by K. W. Wyman
Attorney

Feb. 22, 1944.    J. R. HAGEMANN    2,342,579
PRESSURE REGULATING SYSTEM
Original Filed Sept. 19, 1938    2 Sheets-Sheet 2

Inventor
J. R. Hagemann
by K. S. Wyman
Attorney

Patented Feb. 22, 1944

2,342,579

UNITED STATES PATENT OFFICE 2,342,579

PRESSURE REGULATING SYSTEM

John R. Hagemann, Wauwatosa, Wis., assignor to Allis-Chalmers Manufacturing Company, Milwaukee, Wis., a corporation of Delaware Original application September 19, 1938, Serial No. 230,577, now Patent No. 2,283,138, dated May 12, 1942. Divided and this application January 22, 1942, Serial No. 427,699

6 Claims. (Cl. 137—153)

This invention relates to turbine governing systems and parts thereof and more particularly to such systems and parts especially adapted for regulating a relatively high pressure elastic fluid turbine arranged for operation in connection with an existing low pressure turbine system.

The addition of a high pressure turbine unit, boiler and turbine, to an existing steam plant represents a recent development in turbine systems which make possible the transformation of an antiquated power plant into a modern one with the least possible expense. However, in a system of this type the high pressure turbine, which is known as a superposed or top turbine, may operate under widely varying conditions which are primarily determined by the relative capacities of the superposed turbine and the existing system or that part of the existing system which is in actual operation at any particular time. This necessitates employing a governing system for the superposed turbine which is capable of regulating the turbine in response either to (1) changes in load as determined by changes in speed or (2) variations in back pressure; i. e. changes in the pressure of the exhaust steam which is delivered to the header supplying steam to low pressure turbines and which varies in response to pressure variations in the low pressure header.

A governing system capable of regulating a superposed turbine in the manner aforesaid necessarily comprises a speed responsive device and a pressure regulator cooperating to control the inlet valve or valves of the turbine and, in order to effect satisfactory regulation, it is essential that the pressure regulator be extremely sensitive and capable of maintaining the pressure to be regulated, which may be 200 lbs. per square inch and higher, within narrow limits. In addition, in order to place the turbine under the control of either the speed responsive device or the pressure regulator, the pressure regulator must be so constructed and the means interconnecting the pressure regulator and the speed responsive device so correlated that such a changeover can be readily accomplished without effecting a sudden change in turbine load. This feature, which is of particular importance, is fully disclosed and claimed in my copending application Serial No. 230,577, filed September 19, 1938, now Patent No. 2,283,138, granted May 12, 1942, of which this application is a division.

Pressure regulators have been developed which operated in a satisfactory manner for pressures in the vicinity of 100 pounds per square inch, but with the introduction of the superposed turbine, the pressures to be regulated i. e. the exhaust or back pressure, have been materially increased and are now 200 pounds per square inch and higher and, as a result, known types of regulators are incapable of maintaining the pressure within the extremely narrow limits (permissible pressure variation necessary for satisfactory regulation. The permissible pressure variation decreases as the pressure to be regulated increases and it is therefore essential that the regulator be extremely sensitive; i. e. a relatively small variation in the pressure to be regulated should produce a full stroke of the pressure responsive element which should also respond to incremental changes in pressure in order to be sensitive. The sensitiveness of a pressure regulator can be materially increased by enlarging the effective area of the bellows or other surface exposed to the pressure to be regulated which necessitates increasing the counteracting or balancing force by reducing the scale of the spring producing the counteracting or balancing force which in turn necessitates increasing the size of the spring (more coils or larger diameter). However, these arrangements are impractical as they result in a device of such large physical dimensions as to be prohibitive.

The use of a weight to produce the necessary balancing force appears ideal since it does not introduce a scale. However, the most practical device for operation at pressures exceeding 200 pounds per square inch involves the use of a bellows and bellows satisfactory for operation at such pressures i. e. bellows with a relatively small scale effect, generally have an effective area of approximately 11 square inches which is subjected to the pressure to be regulated. Therefore, if the normal value of the pressure to be regulated is 220 pounds per square inch, the force to be counteracted would be 2420 pounds ($220 \times 11$). Such an arrangement necessitates the use of a weight which is entirely too cumbersome for practical purposes or if a lever arrangement is used in order to reduce the weight, it involves the use of a heavily loaded knife edge which is also undesirable. Moreover, the mass effect of the weight necessitates the application of a relatively large force in order to obtain a sufficient degree of acceleration to avoid sluggishness and when set in motion its momentum tends to produce overregulation and chattering. This requires the application of a suitable damping means such as a dashpot mechanism actuated by movement of the weight and the use of a spring in the connection between the weight and the pressure responsive element and although these additions have improved the operation of such regulators, it is a known fact that the regulators vibrate and chatter excessively which is highly undesirable both from a maintenance and operating standpoint. Therefore, while a weight is perfect under static conditions, it should be obvious that under transient conditions a weight has certain material disadvantages because of its mass which renders its use undesirable, if not impractical.

Therefore, one of the objects of this invention is to provide an improved pressure regulating apparatus which is extremely sensitive and capable of maintaining the pressure to be regulated within the limits necessary for satisfactory operation.

Another object of this invention is to provide an improved pressure regulator including a counteracting force producing means which has the advantages of a weight under static conditions and which does not have the disadvantages produced by the mass effect of a weight under transient conditions.

Still another object of this invention is to provide an improved hydraulic counteracting force producing means for pressure regulators which is readily adjustable to produce desired variations in the counteracting force and which is inherently self-damping at all times.

Still another object of this invention is to provide an improved hydraulic counteracting force producing means for pressure regulators which comprises a liquid column and means continuously flowing a fluid under pressure into contact with the top of the liquid column.

A further object of this invention is to provide an improved non-chattering means for varying without appreciable pulsation the force exerted on a liquid column by a flow of liquid under pressure in contact with the top of the column.

The invention accordingly consists of the various features of construction, combinations of elements, and arrangements of parts as more particularly pointed out in the appended claims and in the detailed description, in which:

Figure 1:
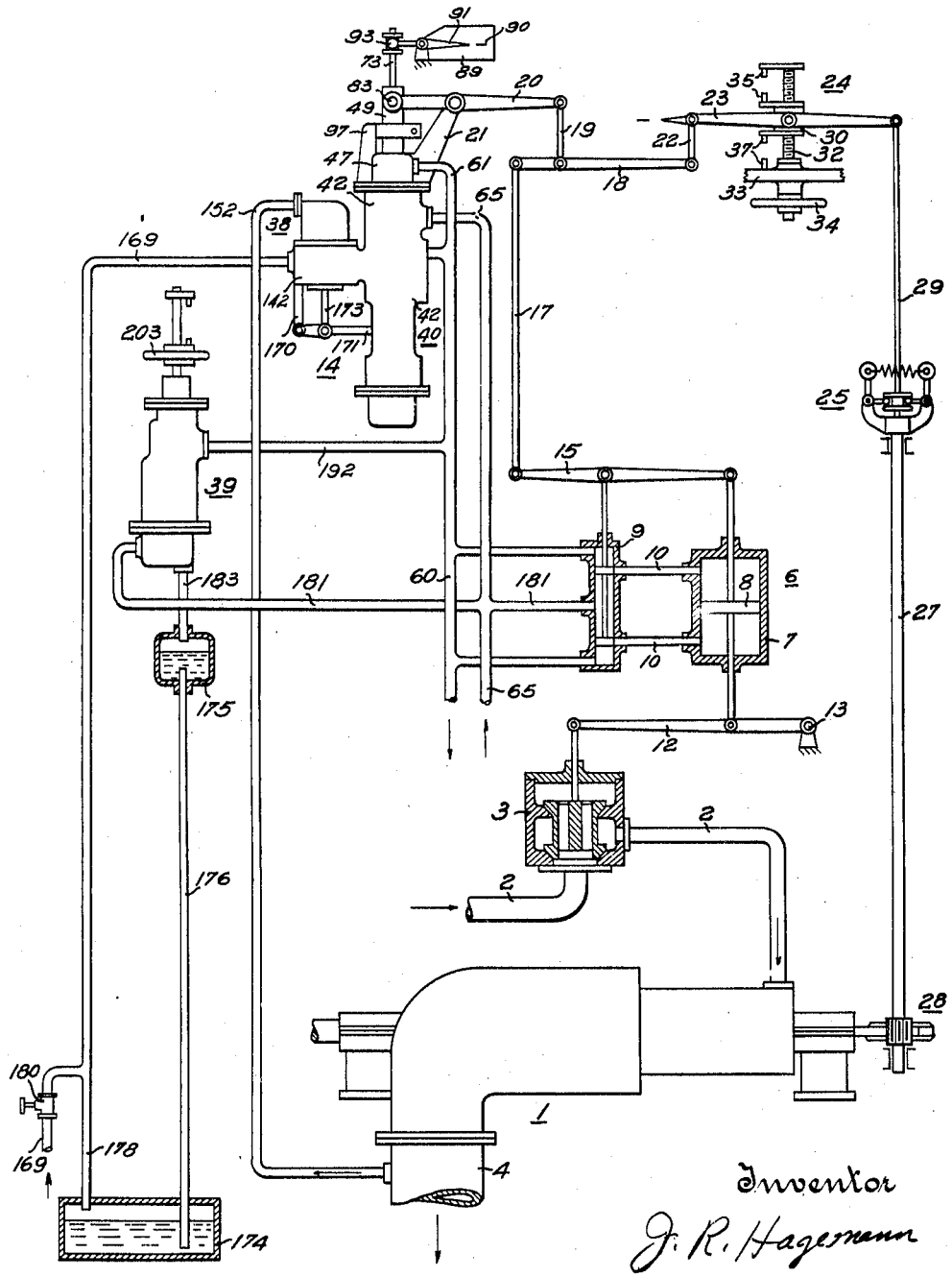
Fig. 1 is a schematic illustration of a governing system embodying the invention.

Referring to Fig. 1, 1 represents a high pressure, superposed or top turbine having a steam admission conduit 2 in which is located a steam admission valve 3. An exhaust conduit 4 discharges the exhaust steam into a low pressure steam header which may be considered as including the exhaust conduit 4 as a part thereof which header is connected with one or more low pressure steam turbines in the usual manner. The header and low pressure turbines are omitted for the purpose of simplifying the disclosure. The steam admission valve 3 is controlled by means of a servomotor 6 comprising a cylinder 7, a double acting power piston 8 therein and a valve 9 controlling the flow of the actuating fluid through pipes 10 to the cylinder 7. The power piston 8 is operatively connected with the valve 3 by means of a lever 12 having one end pivotally connected with the valve 3, its other end pivotally mounted on a fixed pivot 13 and a pivotal connection intermediate its ends with the power piston 8.

A pressure regulator designated generally by the numeral 14 is operatively associated with the valve 9 by mechanism comprising a floating lever 15 connected intermediate its ends with the valve 9 and which has one end pivotally connected with the power piston 8 and its other end pivotally connected with one end of a link 17, the other end of which is pivotally connected with one end of a floating lever 18. A link 19 has one end pivotally connected with the floating lever 18 intermediate its ends and its other end pivotally connected with one end of a lever 20 which is pivotally supported intermediate its ends on a bracket 21 and has its other end pivotally connected with the operator 40 of the pressure regulator 14. A link 22 has one end connected to a lever 23 which is pivotally mounted intermediate its ends on an adjustable fulcrum 24 and which has its other end pivotally connected with one end of a rod 29 which has its other end operatively associated with a speed responsive device 25. The speed responsive device is operatively connected with the turbine spindle by means of a shaft 27 and gearing 28. The adjustable fulcrum 24 comprises an internally threaded block 30 which is mounted on an externally threaded rod or shaft 32 mounted for rotation in a bearing structure 33 and which has attached thereto a hand wheel 34 for rotating the rod 32. The hand wheel 34 cooperates with the bearing structure 33 to prevent longitudinal movement of the rod 32. Stops 35 and 37 limit the upward and downward movement respectively of the block 30 in response to the rotation of the shaft 32.

The pressure regulator 14 comprises a pressure responsive device 38, a balancing force creating means 39 and a power operator 40. Power operator 40 is of the servomotor type and includes a casing 42 substantially enclosing a double acting power piston 49 and a coaxial pilot valve structure 73 which may be of known construction and which has operatively associated with the exposed portion thereof a position indicating means designated 89, 90, 91 and 93. The detailed construction of the power operator and of the position indicating means, which are fully disclosed in my said copending application, are unnecessary for a complete understanding of this invention and have therefore been omitted in the interest of simplicity. In this connection, it is sufficient to point out that the exposed portion of the power piston 49 is pivotally connected at 83 with the lever 20, that the coaxial pilot valve 73 is operatively connected with the pressure responsive device 38, and that a movement of the pilot valve 73 effects an immediate and corresponding movement of the power piston 49.

The casing 42 has a laterally extending bracket 142 constituting a base or a supporting surface for the pressure responsive device 38; the base having therein a centrally disposed opening 143. A large bellows 144 including an annular carrier 145 having an outward and laterally extending flange 146 thereon is mounted on the base 142 in concentric relation with the opening 143 therein. A casing 147, which is adapted to enclose the bellows 144, is provided at its bottom edge with an outwardly and laterally extending flange 148 which cooperates with the flange 146 on the annular bellows carrier 145 and securely clamps the bellows 144 to the base 142. The space between the inner wall of the casing 147 and the bellows 144 defines a pressure chamber 149 having a fluid inlet passage 150 which communicates by means of a pipe 152 with the fluid under pressure which is to be regulated. Disposed within the large bellows 144 is a relatively small bellows 153 which is mounted in coaxial alinement with the opening 143 in the base 142 and has an elongated annular carrier 154 extending through the opening 143 in the base 142 which carrier has an outward and laterally extending flange 155 abutting the undersurface of the base 142. An annular clamping ring 156, which is secured to the base in any desired manner, cooperates with the flange 155 on the carrier 154 to securely clamp the carrier 154 to the base 142. The large bellows 144 has a bellows cap 157 which has in its upper and lower surfaces centrally disposed recesses 158 and 159, respectively, which are in communication by means of an axially extending bore 160. The small bellows 153 has a bellows cap 162, the upper portion of which has an external diameter slightly less than the internal diameter of the recess 159 in the large bellows cap 157. The upper and lower surfaces of the bellows cap 162 have centrally disposed internally threaded recesses 163 and 164, respectively. The recess 163 is in axial alinement with the bore 160 in the large bellows cap 157 and the large and small bellows caps are secured together by means of a cap screw 165 which passes through the bore 160 in the large bellows cap and threadably engages the small bellows cap by means of the internally threaded recess 163.

The annular space existing between the large and small bellows constitutes a balancing pressure chamber 167 into which a fluid under pressure is admitted by means of passage 168 to which is connected a fluid supply pipe 169. Depending from the base 142 is a bracket 170 to which is pivotally connected one end of a lever 171 which has its opposite end operatively connected with the lower end of the pilot valve 73 in any suitable manner (not shown). A rod 173 extends upwardly through the annular carrier 154 and has its upper, threaded end threadably engaged with the small bellows cap by means of the internally threaded recess 164 and its lower end pivotally connected to the lever 171 intermediate the ends thereof.

The balancing force creating means designated generally by numeral 39 comprises means for establishing a hydraulic column consisting of a lower closed vessel 174, an upper closed vessel 175 and a pipe 176 connecting the upper and lower vessels and extending a material distance within and towards the bottom of the latter. A pipe 178 communicates with the top portion of the lower vessel 174 and with the pipe 169 which includes a valve 180 for controlling the supply of a fluid such as water having a density materially less than that of the mercury or other fluid used to establish the hydraulic column. The valve 180 is normally closed during operation and is used for the purpose of adding additional fluid to replace that lost by leakage and for initially filling the system when it is placed in operation. The counteracting force produced by the hydraulic column is varied by subjecting the top of the column, which is maintained in the vessel 175, to a variable fluid pressure. A suitable viscous fluid such as oil is supplied to the vessel 175 by means of a pipe 181 communicating with a source of fluid under pressure, a pressure regulator 182 and a pipe 183 connecting the regulator 182 with the top of vessel 175.

The pressure regulator 182 comprises a housing having a fluid inlet passage 184, a filter chamber 185, a passage 186, a needle valve 187, a chamber 188, a pressure regulating valve 189 and a relatively large accumulating or pressure relieving chamber 190. The flow of fluid to the chamber 188 is controlled by means of the needle valve 187 and the pressure within the chamber 188 is maintained at the desired value by means of the valve 189 controlling communication between chambers 188 and 190. The fluid entering the chamber 190 flows therefrom through a pipe 192 which communicates with the chamber 190 a material distance above the valve 189 and with a reservoir (not shown), thereby rendering chamber 190 effective to retain a predetermined quantity of prssure relieved fluid therein. In other words, the enlargement constituting chamber 190 accumulates and retains therein a predetermined quantity of pressure relieved fluid in an approximately quiescent state.

Figures 2, 3:
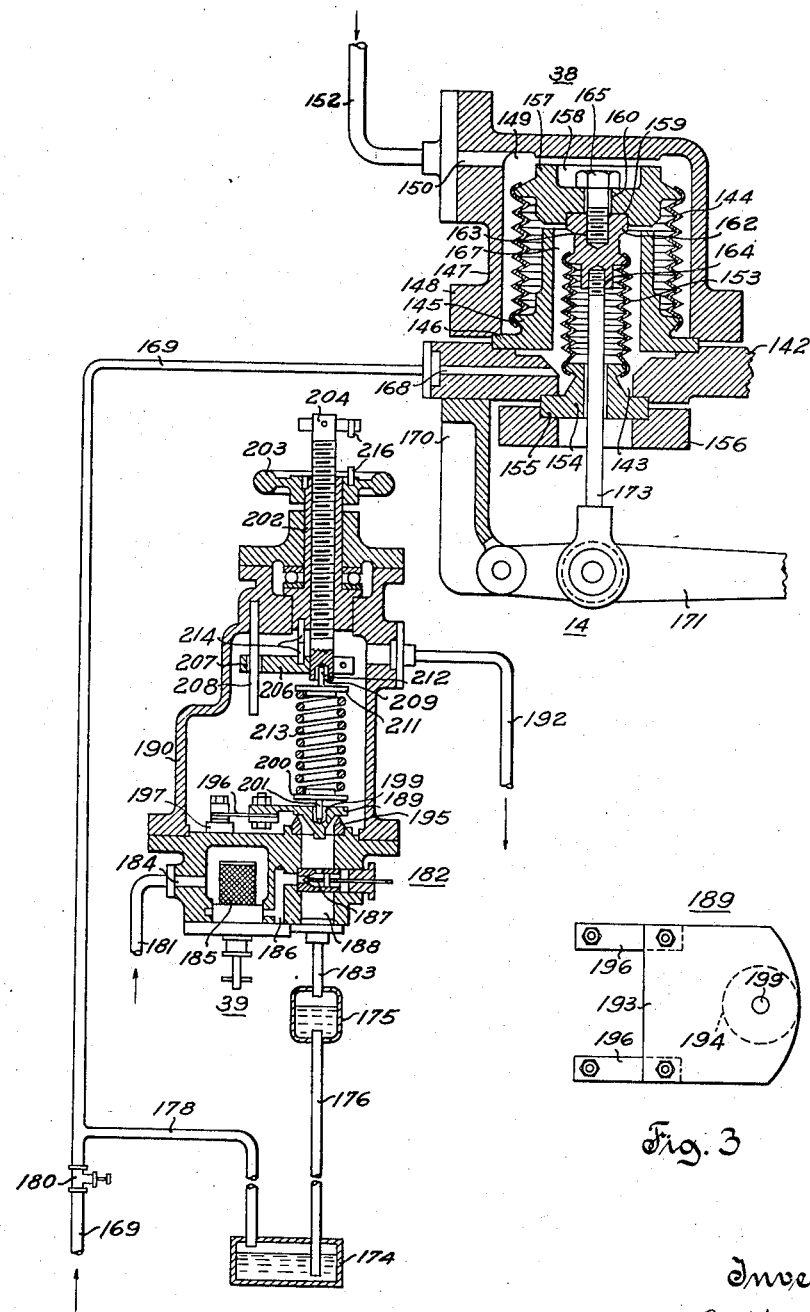
Fig. 2 is a detailed sectional view of the pressure regulator and the means producing the counteracting force illustrated generally in Fig. 1.
Fig. 3 is a plan view of the pressure regulating valve element.

The valve 189, reference also being had to Fig. 3, comprises a generally rectangular valve plate or disk 193 having on its under surface a depending thickened circular portion 194 cooperating with an annular knifelike edge 195 constituting a valve seat. The end of the valve disk remote from the end having the depending seating surface thereon has rigidly secured thereto in spaced parallel relation a pair of rearwardly extending spring bars 196 which are in turn secured to a pair of bosses 197, constituting the fulcrum for the disk 193. The upper surface of the valve disk 193 is provided with a recess 199 disposed in coaxial relation with the valve seat 195 which recess has its bottom surface shaped in the form of an inverted cone. A spring retainer 200 has a depending centrally disposed stem 201 of less diameter than the internal diameter of the recess 199 in the valve plate 193 which extends into the recess 199 and has its lower end shaped to conform with the bottom surface thereof.

The housing of the pressure regulator 182 includes a rotatable internally threaded sleeve 202 disposed above the oil chamber 190 and in coaxial relation with the recess 199 in the valve plate 193; said sleeve being provided with a hand wheel 203 for rotating the same. An externally threaded rod 204 extends through the sleeve 202 and has its ends extending beyond the end portions of the said sleeve. The lower end portion of the rod 204 has secured thereto a plate 206 having an opening 207 therethrough which extends in parallel relation to the rod 204. A fixed pin 208 extends downward through the opening 207 in the plate 206 whereby the rod 204 is prevented from rotating when the sleeve 202 is rotated. The lower end of the rod 204 is provided with a recess 209, which is similar to the recess 199 in the valve plate 193, and a spring retainer 211, which is provided with a centrally disposed stem 212 of less diameter than the recess 209, is mounted with the stem 212 extending within the recess 209. A compression spring 213 is mounted with its lower end supported on the spring retainer 200 and its upper end engaging the spring retainer 211 whereby rotation of the hand wheel 203 produces an axial movement of the rod 204 to vary the compression of the spring 213 which constitutes the primary biasing means for the valve 189. Stops 214 and 216 are provided for limiting the upward and downward movement, respectively, of the rod 204.

The valve disk 193 cooperates with the pressure relieved viscous fluid retained in a quiescent state in accumulating chamber 190 to eliminate chattering or vibration of the valve, an inherent defect in regulating valve arrangements, which quickly destroys the valve seat and renders the valve inoperative to maintain the pressure within the narrow limits necessary for satisfactory operation. In the usual arrangement, a sudden increase in pressure produces an extremely rapid opening of the valve thereby accelerating the valve mechanism and, due to the momentum or kinetic energy effect, the valve is opened much wider than if the pressure were increased gradually. The energy which is stored in the biasing spring then acts to move the valve toward its closed position and as a result the system chatters or oscillates and tends to produce pulsations in the pressure of the fluid in addition to the destructive effects previously stated. In order to eliminate this common defect, it is essential to produce a damping effect sufficient to prevent the valve from opening wider upon a sudden increase in pressure than it would open if the pressure were increased gradually. This result is accomplished by rendering the valve, disk 193, inherently self-damping by submerging the disk 193 in the pressure relieved quiescent liquid retained in accumulating chamber 190 whereby its movement is always resisted by a quiescent body of viscous fluid contained therein and, while the responsiveness of the valve will vary with changes in viscosity, it has been determined empirically that, in order to obtain satisfactory results, the area of the surface acted upon by the viscous fluid to retard the valve movement must be at least five times greater than the area of the surface acted upon by the fluid under pressure to produce an opening movement of the valve.

The operation of the pressure regulator illustrated by Fig. 2, assuming that the pressure to be regulated increases slightly, is as follows: The large bellows 144 is slightly compressed and, since the large bellows 144 and the small bellows 153 are secured together as a unit, the rod 173 moves downward and moves the lever 171 in a clockwise direction about its fixed pivot point on the bracket 170 and effects a simultaneous downward movement of the pilot valve 73 which in turn effects a corresponding movement of the power piston 49. The piston 49 and the valve member 73 are now in the usual neutral position assumed by apparatus of this type and no further movement of either the valve member 73 or the piston 49 will occur until the pressure to be regulated again changes or the means producing the counteracting force is varied by turning the hand wheel 203. Upon a decrease in pressure, the operation is similar to that just described, the only difference being that the valve member 73 and the piston 49 are moved upward instead of downward. Movement of the piston 49 is transmitted through a system of levers such as shown in Fig. 1 to the turbine admission valve or valves.

The use of an inner bellows 153 cooperating with a larger bellows 144 to form therebetween a counteracting pressure chamber eliminates the use of a seal or gland about the rod 173 which materially increases the sensitiveness of the regulator by eliminating the friction inherently produced when a gland or other stationary means contacts a moving part to provide an effective fluid seal. The simultaneous compression of the bellows 144 and 153 in response to an increase in pressure necessarily displaces some fluid from the chamber 167, but since the bellows 144 and 153 move simultaneously, the actual displacement is a minimum as the compression of bellows 153 tends to maintain the volume of chamber 167 constant. In addition, only a slight movement of the bellows 144 and 153, approximately 0.09 of an inch, is necessary in order to obtain a full stroke of the power operator which also aids in maintaining the actual displacement of fluid at a minimum. Moreover, since the inside diameter of the vessel 175 is six inches, the increase in the height of the hydraulic column effected by a movement of the bellows sufficient to produce a full stroke of the regulator is less than 0.04 inch and the resulting pressure increase, which is comparable to the scale effect of a spring, is less than 0.02 of a pound per square inch.

The effective area of bellows 144 which is subjected to the pressure to be regulated is 11.8 square inches and the effective area subjected to the counteracting force is 10.6 square inches. Therefore, if the no load back pressure is 220 pounds per square inch, the actual force which must be counteracted is $220 \times 11.8$ or 2596 pounds and the balancing pressure required equals 2596 divided by 10.6 or 245 pounds per square inch. 2.04 inches of mercury produces a pressure of one pound per square inch which necessitates, neglecting friction and the spring effect of bellows 144 and 153, the use of a hydraulic column of mercury 42 feet in height in order to produce the requisite balancing pressure. The inside diameter of pipe 176 connecting the vessels 174 and 175 is one-fourth of an inch and its cross sectional area is approximately 0.047 square inch. Consequently, the mass of mercury necessary to produce the requisite pressure is approximately 11.6 pounds and, if for purposes of illustration, it is assumed that the water pipes 169 and 178, which are one-half inch inside diameter, are twice the length of the mercury column, pipe 176, (the length employed in actual practice is usually about one-fourth that assumed) it is obvious that the total mass of the fluid moved in response to a full stroke movement of the pressure responsive device is approximately 11.6 pounds plus (2) (4) (11.6) divided by 13.6 which is the approximate weight of the water contained in pipes 169 and 178 since the volume of the water is approximately eight times the volume of the mercury contained in pipe 176 and since the density of mercury is 13.6 times that of water or only 18.4 pounds as compared to 2596 pounds when a weight is directly applied. Thus it is seen that the mass effect of the disclosed arrangement is materially less than that encountered when a weight is directly applied to the pressure responsive device.

The inherent damping effect of a hydraulically balanced system, particularly when modified by the use of a throttling constriction or valve or by a proper selection of the pipe sizes employed to obtain the desired degree of damping, eliminates the use of a dashpot and spring arrangement which is necessary to reduce the chattering effect which is always produced when a weight is employed to create the necessary counteracting force. In this connection, particular attention is directed to the fact that it is essential, in order to obtain satisfactory damping in a regulator system of this type, that the liquid in the system must not act to cause or permit the pressure responsive device to continue to move after reaching a position corresponding to that which it would attain in response to a gradual application of the motivating force.

The use of a smaller weight and a lever arrangement would not only introduce the use of a relatively heavily loaded knife edge which is an undesirable feature but it would also materially increase the kinetic energy imparted to the system since when a weight is directly applied, the kinetic energy imparted is $$\frac{MV^2}{2}$$

or $$\frac{W1V1^2}{2g}$$

whereas when a smaller weight and a lever arrangement is used the kinetic energy imparted, which is $$\frac{W1V1^2R}{2g}$$

is increased due to the fact that $$W2 = \frac{W1}{R}$$

and $V2 = RV1$. Moreover a lever arrangement operable with a mass of approximately fourteen pounds would require a lever of more than one hundred eighty five inches in length, which would render such an arrangement impractical.

In connection with the foregoing, it should be understood that while hand wheels or the like have been described and illustrated for adjusting the fulcrum 24 and the counteracting force varying means, it is contemplated that such adjustments can be readily made, if desired, by means of motors and gearing which may or may not be remotely and automatically controlled as such variations can be readily effected by any one skilled in the art. The invention is applicable to pressure regulating apparatus of various types and it should be understood that it is not desired to limit the invention to the exact construction and mode of operation herein disclosed as numerous variations within the scope of the claims may occur to persons skilled in the art.

It is claimed and desired to secure by Letters Patent:

1. In combination, regulating apparatus including an element responsive to variations in the pressure of a fluid to be regulated, a liquid column acting on and opposing movement of said element in response to an increase in the pressure of said fluid, means for conducting a liquid under pressure into contact with the top of said liquid column, means defining an enlarged pressure relieving chamber communicating with the top of said liquid column and adapted to retain a predetermined quantity of pressure relieved liquid therein, and means for regulating the pressure of the liquid acting on the top of said liquid column comprising a valve controlling communication between said chamber and the top of said liquid column and including an actuating part responsive to the pressure of the liquid acting on the top of said liquid column and a damping part submerged in the pressure relieved liquid retained in said chamber.

2. In combination, regulating apparatus including an element responsive to variations in the pressure of a fluid to be regulated, a liquid column acting on and opposing movement of said element in response to an increase in the pressure of said fluid, means for conducting a liquid under pressure into contact with the top of said liquid column, means defining an enlarged pressure relieving chamber which communicates with the top of said liquid column and is adapted to retain in an approximately quiescent state therein a predetermined quantity of pressure relieved liquid, and means for regulating the pressure of the liquid acting on the top of said liquid column comprising a valve controlling communication between said chamber and the top of said liquid column and including an actuating part responsive to the pressure of the liquid acting on the top of said liquid column and a damping part submerged in the pressure relieved liquid retained in said chamber.

3. In combination, regulating apparatus including an element responsive to variations in the pressure of a fluid to be regulated, a liquid column acting on and opposing movement of said element in response to an increase in the pressure of said fluid, a source of liquid under pressure independent of the fluid to be regulated, means for conducting liquid under pressure from said source into contact with the top of said liquid column, means defining a pressure relieving chamber communicating with the top of said liquid column and adapted to retain a predetermined quantity of pressure relieved liquid therein, and means for regulating the pressure of the liquid acting on the top of said liquid column comprising a valve controlling communication between said chamber and the top of said liquid column and including an actuating part responsive to the pressure of the liquid acting on the top of said liquid column and a damping part submerged in the pressure relieved liquid retained in said chamber.

4. In combination, regulating apparatus including an element responsive to variations in the pressure of a fluid to be regulated, a liquid column acting on and opposing movement of said element in response to an increase in the pressure of said fluid, means for conducting a liquid under pressure into contact with the top of said liquid column, means defining a pressure relieving chamber communicating with the top of said liquid column and adapted to retain a predetermined quantity of pressure relieved liquid therein, and means for regulating the pressure of the liquid acting on the top of said liquid column comprising a valve for controlling communication between said chamber and the top of said liquid column, said valve being submerged in the pressure relieved liquid retained in said chamber and presenting an actuating surface subjected to the pressure of the liquid acting on the top of said liquid column and a damping surface having an effective area at least five times greater than the area of said actuating surface.

5. In combination, regulating apparatus including an element responsive to variations in the pressure of a fluid to be regulated, a liquid column acting on and opposing movement of said element in response to an increase in the pressure of said fluid, means for conducting a liquid under pressure into contact with the top of said liquid column, means defining a pressure relieving chamber communicating with the top of said liquid column and adapted to retain a predetermined quantity of pressure relieved liquid therein, and means for regulating the pressure of the liquid acting on the top of said liquid column comprising a valve controlling communication between said chamber and the top of said liquid column, said valve being submerged in the pressure relieved liquid retained in said chamber and presenting an actuating surface subjected to the pressure of the liquid acting on the top of said column and a damping surface disposed approximately at right angles to the direction of valve movement.

6. In combination, regulating apparatus including an element responsive to variations in the pressure of a fluid to be regulated, a liquid column acting on and opposing movement of said element in response to an increase in the pressure of said fluid, means for conducting a liquid under pressure into contact with the top of said liquid column, means defining a pressure relieving chamber communicating with the top of said liquid column and adapted to retain a predetermined quantity of pressure relieved liquid therein, and means for regulating the pressure of the liquid acting on the top of said liquid column comprising a valve controlling communication between said chamber and the top of said liquid column, said valve being submerged in the pressure relieved liquid retained in said chamber and presenting an actuating surface subjected to the pressure of the liquid acting on the top of said liquid column and a damping surface disposed approximately at right angles to the direction of valve movement and having an effective area at least five times greater than the area of said actuating surface.

JOHN R. HAGEMANN.